March 6, 1962 J. LEVIN 3,023,519
COMPASS MAP
Filed April 17, 1959
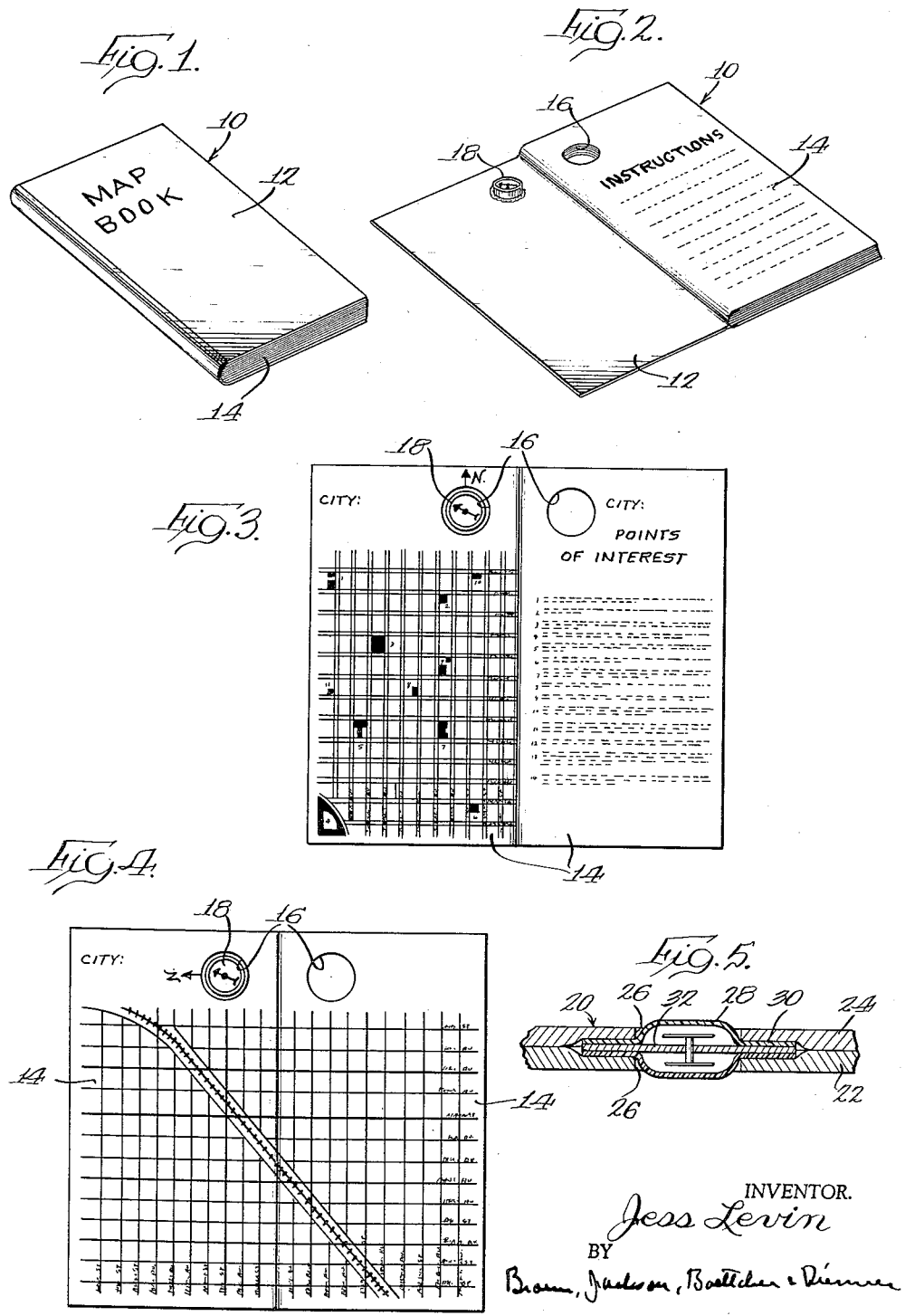

Patented Mar. 6, 1962

3,023,519
COMPASS MAP
Jess Levin, Oak Park, Ill. (% La Salle Gift & Card Shop, 119 W. Van Buren St., Chicago, Ill.)
Filed Apr. 17, 1959, Ser. No. 807,241
1 Claim. (Cl. 35—40)

The present invention relates to maps, and particularly, to map cards and books including a plurality of maps and a compass for use with each of the maps.

It is an initial object of this invention to incorporate a compass in a book or card with a plurality of maps for use with each of the maps.

Another object of the invention is to provide compass maps as above defined wherein the maps may have their North compass points located in random directions, and the compass is adapted for use with each map irrespective of the direction of the map's North compass point.

Specifically, it is one object of the present invention to provide a map book comprising a cover, a plurality of maps bound within the cover and having aligned apertures therein, and a compass secured to the inner surface of the cover in alignment with said apertures for disposition therethrough, whereby the compass is permanently associated with the maps and is exposed to view for use with each map.

A second specific object of the invention is the provision of a map card having maps on the opposite surfaces thereof and a single compass carried by the card for use with the maps printed thereon.

A further object of the invention is to provide compass maps as above described wherein the compass per se is not provided with compass points, and the points are printed on each map, preferably about the aperture therein, in accordance with the respective map's North compass point, thereby to eliminate confusion in use of the maps and compass.

Other objects and advantages of the invention will become apparent in the following detailed description.

Now, in order to acquaint those skilled in the art with the manner of making and using my compass maps, I shall describe, in connection with the accompanying drawing, preferred embodiments of my maps and the manner of use thereof.

In the drawing:

FIGURE 1 is a perspective view of one embodiment of my map book in the closed position thereof;

FIGURE 2 is a perspective view of the book with its front cover open;

FIGURE 3 is a plan view of the book as opened to a map having its North compass point directed toward the top of the book;

FIGURE 4 is a plan view of the book as opened to a map having its North compass point directed toward the side of the book; and FIGURE 5 is a fragmentary cross-sectional view of one embodiment of my map card.

Referring now to the drawing, and particularly to FIGURES 1 to 4, I shall describe one embodiment of my map book. As shown, this embodiment of my invention comprises a book 10 of any known type, such as a notebook, a bound volume, or a looseleaf book. As is customary, the book includes a cover 12, comprised of front and back cover-boards, and a plurality of pages 14 bound within the cover.

In accordance with the present invention, the sheets or pages 14 of the book comprise essentially maps, or maps together with suitable descriptive material noting points of interest, historical data, etc. Each sheet or page in the book is provided with an aperture 16 therein, suitably adjacent the upper edge of the respective sheet, and the apertures in the several sheets are aligned to define a hollow space within the interior of the book. Fitted within this hollow is a compass 18 which is secured to the inner surface of the cover 12. In the illustrated embodiment of the invention, the compass is glued or cemented to the inner surface of the front coverboard in alignment with the apertures 16 in the pages 14, the apertures preferably being die-cut to the same configuration and of a size slightly larger than the compass to accommodate disposition of the compass therethrough and to accommodate turning of the pages or sheets without interference with the compass. When the book is closed, the compass is disposed between the two cover-boards and housed within the hollow space formed by the apertures 16, thereby to be shielded and protected from damage.

When the compass 18 is mounted on the front coverboard, the maps in the book are printed on at least the left-hand page or on both pages of the double page exposure provided upon opening of the book, whereby the compass is exposed to view in immediate and substantially integral correlation with the map, as is illustrated in FIGURES 3 and 4, thereby to afford the user all the equipment necessary to ascertain the way to his destination. In using this book, the user need only open the book to the appropriate map and turn the book in his hands to align the North compass of the map with the arrow of the compass needle, whereupon the direction of travel required of him will become immediately apparent.

Due to the provision of the compass in the manner defined, there is no need to mount the maps in the book with their North compass points disposed in a common direction. For example, one map may have its North compass point directed toward the top of the book (FIGURE 3), another toward the side of the book (FIGURE 4), another diagonally of the book, etc., thereby to facilitate printing and assembly of the maps in the most convenient and practical manner.

Further to facilitate use of my map book, and to mitigate confusion in use thereof, I provide a compass 18 that is not marked with any compass points, but includes only the standard compass needle. The compass points, or at least the North compass point of each map is then printed on the respective map immediately adjacent the edge of the aperture therethrough, as is shown in FIGURES 3 and 4. The book is thus constituted and assembled in the most convenient and practical manner for the benefit of both the manufacturer and the user.

In a simplified embodiment of my compass map, which is illustrated in FIGURE 5, the maps are printed on opposite surfaces of a relatively stiff card 20 that is preferably of a convenient size to be slipped into the pocket or purse of a user. The card 20 is preferably comprised of two sheets 22 and 24 glued together in back-to-back relation, the two sheets having aligned apertures 26 therein. Fitted within the apertures 26 is a compass 28, which is preferably quite thin so as to project a minimum distance outwardly from the opposite surfaces of the card. Also, the side wall portions of the compass are preferably tapered, as shown, so as to present no sharp obstruction to insertion or removal of the card into and from the user's pocket. The compass suitably includes a marginal flange portion 30 which is cemented between the two sheets 22 and 24 thereby permanently to associate the compass with the card. In this case, the compass includes transparent covers to both sides thereof and a compass needle to each side of the central support member 32, so that the needle of the compass may be viewed from both sides of the card.

As a consequence of the described construction, maps may be printed on both sides of the card, and the map or maps on one side need have no correlation relative to North compass point with the map or maps on the other side. The North compass points of the respective maps are printed directly thereon, preferably adjacent the edge of the respective aperture 26. Of course, if the maps on both sides have a common North direction then the compass need show only to one side of the card. Accordingly, the card affords for a limited number of maps, usually two, the same advantages as the book does for a greater number of maps.

Having thus described what I regard to be the preferred embodiments of my invention, it will be apparent, particularly to those skilled in the art, that various changes, rearrangements and modifications may be made therein without departing from the scope of the invention, as defined by the appended claim.

I claim:

A map book comprising a front cover portion, a back cover portion, and a hinge portion connecting said front and back cover portions, a plurality of pages bound together and to the hinge portion whereby the book may be opened out flat in horizontal position and the cover portions and the pages individually revealed in that position, a compass fixedly mounted on the inside of one of said cover portions at one side of the hinge portion and facing inwardly, and comprising a magnetic compass needle pivoted to swing in a plane parallel to the plane of the cover portion on which it is mounted, said needle having an indication of its North seeking pole, said pages having maps thereon, each map bearing an indication of the chief compass directions of the region depicted in said map, said pages having openings slightly larger than the size of the compass registering with each other and with the compass, whereby when the book is laid open with the compass-bearing cover portion in a horizontal position the compass will indicate North, and each map may selectively be viewed simultaneouly with a view of the compass needle through one or more of the openings through the pages in the book, and the book may then be brought angularly into a position whereby the indications of the magnetic needle and of the compass point indications on the selected map will be in register.

References Cited in the file of this patent

UNITED STATES PATENTS

| | | |
|---|---|---|
| 980,673 | Quidor | Jan. 3, 1911 |
| 1,108,457 | Maull | Aug. 25, 1914 |
| 1,450,261 | Robinson | Apr. 3, 1923 |
| 1,640,246 | Murray | Aug. 23, 1927 |
| 1,642,580 | Erb | Sept. 13, 1927 |

FOREIGN PATENTS

| | | |
|---|---|---|
| 102,664 | Sweden | Sept. 30, 1941 |